United States Patent
Takayanagi et al.

(10) Patent No.: US 9,267,838 B2
(45) Date of Patent: Feb. 23, 2016

(54) COLLECTING CHUTE OF COMBINATION WEIGHER

(75) Inventors: Kazuo Takayanagi, Akashi (JP); Kouhei Kikuchi, Takarazuka (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 245 days.

(21) Appl. No.: 13/881,133

(22) PCT Filed: Oct. 25, 2010

(86) PCT No.: PCT/JP2010/006300
§ 371 (c)(1),
(2), (4) Date: Jul. 15, 2013

(87) PCT Pub. No.: WO2012/056488
PCT Pub. Date: May 3, 2012

(65) Prior Publication Data
US 2013/0284523 A1    Oct. 31, 2013

(51) Int. Cl.
*G01G 19/393* (2006.01)
*B65G 11/00* (2006.01)
*B65G 11/18* (2006.01)
*B65G 47/18* (2006.01)
*G01G 19/387* (2006.01)

(52) U.S. Cl.
CPC .......... *G01G 19/387* (2013.01); *G01G 19/393* (2013.01); *B65G 11/00* (2013.01); *B65G 11/183* (2013.01); *B65G 11/186* (2013.01); *B65G 47/18* (2013.01)

(58) Field of Classification Search
CPC ... G01G 13/16; G01G 19/387; G01G 19/393; B65G 11/18; B65G 11/183; B65G 11/186; B65G 11/00; B65G 47/18; B65G 47/20
See application file for complete search history.

(56) References Cited

U.S. PATENT DOCUMENTS 4,558,774 A * 12/1985 Mikami ................. 193/2 R
4,569,405 A *  2/1986 Oshima ................. 177/25.18
(Continued)

FOREIGN PATENT DOCUMENTS

CN    101421595 A    4/2009
CN    101581597 A    11/2009
(Continued)

OTHER PUBLICATIONS

Search Report for EP 10 85 8885, mailed Feb. 4, 2015.
(Continued)

*Primary Examiner* — Randy W Gibson
(74) *Attorney, Agent, or Firm* — Marshall, Gerstein & Borun LLP (57) ABSTRACT

A collecting chute of a combination weigher has three discharge paths and can discharge objects so as to not get stuck in a discharge path. The collecting chute includes an inner funnel which discharges in an inward direction, a right outer funnel which discharges in an outward direction from the hoppers in a right group, and a left outer funnel which discharges in an outward direction from the hoppers in a left group, and a right chute member in which an edge of the right outer funnel is coupled to an outer surface of a right funnel section constituting the inner funnel and a left chute member in which an edge of the left outer funnel is coupled to an outer surface of a left section constituting the inner funnel are removably mounted to a frame.

4 Claims, 6 Drawing Sheets

(56) References Cited

U.S. PATENT DOCUMENTS

| | | | | |
|---|---|---|---|---|
| 4,596,327 | A | * | 6/1986 | Yamano .................. 198/533 |
| 4,602,709 | A | * | 7/1986 | Ueda ........................ 193/2 R |
| 4,614,262 | A | * | 9/1986 | Konishi ...................... 193/23 |
| 4,693,355 | A | | 9/1987 | Bochi et al. |
| 4,821,820 | A | * | 4/1989 | Edwards et al. ........... 177/25.18 |
| 4,844,190 | A | * | 7/1989 | Mikami et al. ............. 177/25.18 |
| 2009/0301792 | A1 | * | 12/2009 | Kawanishi ................. 177/25.18 |
| 2012/0103703 | A1 | | 5/2012 | Zheng |
| 2015/0226600 | A1 | * | 8/2015 | Kikuchi .............. G01G 19/393 177/25.18 |

FOREIGN PATENT DOCUMENTS

| | | | | |
|---|---|---|---|---|
| EP | 0 101 313 A2 | | 2/1984 | |
| EP | 1970682 | * | 9/2008 | .......... G01G 19/387 |
| EP | 2634544 | * | 9/2013 | .......... G01G 19/387 |
| JP | 58-108414 | | 6/1983 | |
| JP | 61-84821 | | 6/1986 | |
| JP | 62-091819 | | 4/1987 | |
| JP | 08-152353 | | 6/1996 | |
| JP | 08-271328 | | 10/1996 | |
| JP | 2003-121249 A | | 4/2003 | |
| JP | WO 2007119679 A1 | * | 10/2007 | .......... G01G 19/387 |
| JP | 2008-020269 A | | 1/2008 | |
| JP | 2008-105714 A | * | 5/2008 | .......... G01G 19/387 |
| JP | 2008-105714 A | | 5/2008 | |
| JP | 2008-133113 A | * | 6/2008 | .......... G01G 19/387 |
| JP | 2008-298498 A | | 12/2008 | |
| JP | 2009-019939 A | | 1/2009 | |
| JP | WO 2012056488 A1 | * | 5/2012 | .......... G01G 19/387 |

OTHER PUBLICATIONS

International Search Report for PCT/JP2010/006300, mailed Nov. 22, 2010.

* cited by examiner

PRIOR ART

US 9,267,838 B2

COLLECTING CHUTE OF COMBINATION WEIGHER

FIELD OF THE INVENTION

The present invention relates to a collecting chute for use in a combination weigher having three discharge paths.

BACKGROUND ART

As a conventional example of the combination weigher, there is a combination weigher having three discharge paths (e.g., see Patent Literatures 1 and 2, etc.).

Figure 6:
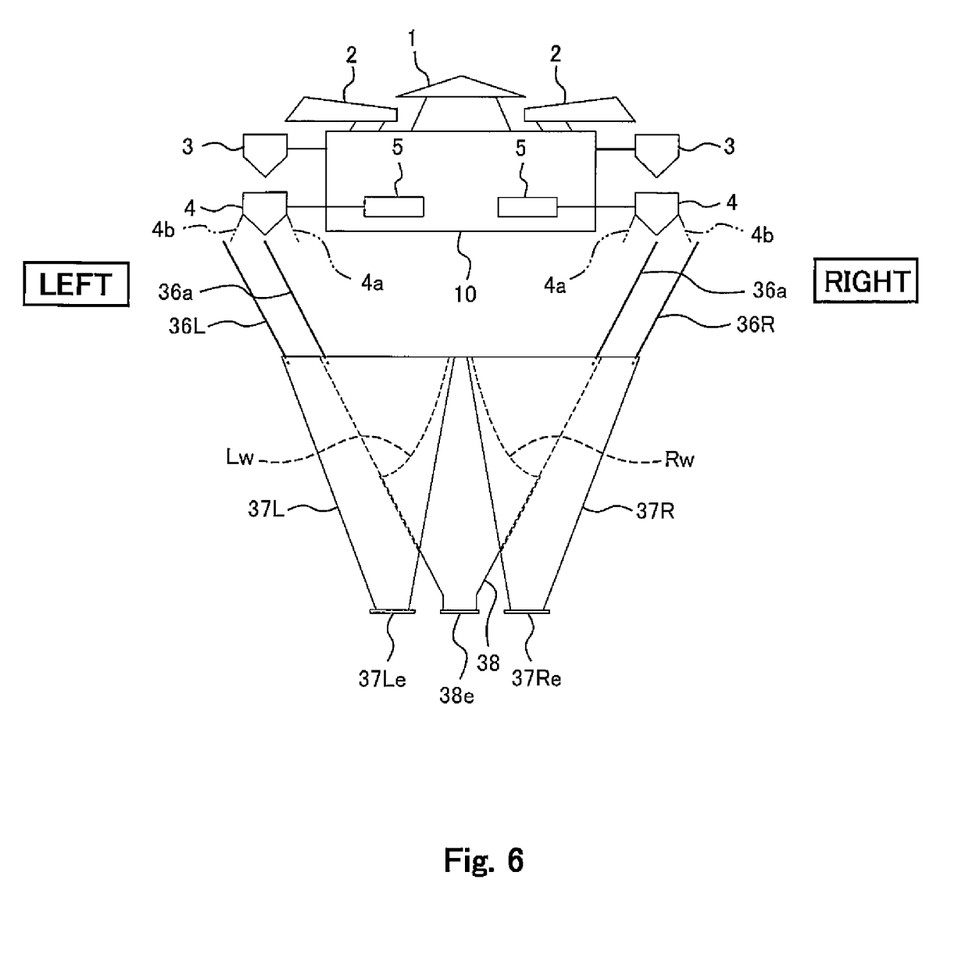
FIG. 6 is a schematic view of a combination weigher using a conventional collecting chute when viewed from laterally, a part of which is illustrated in cross-section.

FIG. 6 is a schematic view of a combination weigher using a conventional collecting chute when viewed from laterally, a part of which is illustrated in cross-section.

This combination weigher includes a conical dispersion feeder 1 provided at an upper portion of a center base body 10 to radially disperse objects supplied from an outside supplying device, by vibration. Around the dispersion feeder 1, a plurality of linear feeders 2 are provided to feed the objects sent from the dispersion feeder 1 to feeding hoppers 3, respectively, by vibration. The feeding hoppers 3 are provided below the linear feeders 2, respectively, and weighing hoppers 4 are provided below the feeding hoppers 3, respectively. The feeding hoppers 3 are arranged around the center base body 10 in a circular shape, while the weighing hoppers 4 are arranged around the center base body 10 in a circular shape. Each of the weighing hoppers 4 is attached with a weight sensor 5 such as a load cell for measuring a weight of the objects inside the weighing hopper 4.

Below the weighing hoppers 4 arranged in the circular shape, a collecting chute having three discharge paths is provided. This collecting chute includes an upper chute section including an inner chute 36a, a right outer chute 36R and a left outer chute 36L, and a lower collecting funnel section.

The lower collecting funnel section includes an inner funnel 38, a right outer funnel 37R, and a left outer funnel 37L. The objects discharged by opening an inner gate 4a of each weighing hopper 4, slide downward on and along an inner chute 36a and the inner funnel 38 and are discharged through a discharge outlet 38e. The objects discharged by opening outer gates 4b of the weighing hoppers 4 corresponding to a right half part, among the weighing hoppers 4 arranged in the circular shape, slide down on the right outer chute 36R and the right outer funnel 37R and are discharged through a discharge outlet 37Re. The objects discharged by opening outer gates 4b of the weighing hoppers 4 corresponding to a left half part, among the weighing hoppers 4 arranged in the circular shape, slide down on the left outer chute 36L and the left outer funnel 37L and are discharged through a discharge outlet 37Le.

CITATION LISTS

Patent Literature

Patent Literature 1: Japanese Laid-Open Patent Application Publication No. 2008-020269
Patent Literature 2: Japanese Laid-Open Patent Application Publication No. Hei. 8-152353

SUMMARY OF INVENTION

Technical Problem

The combination weigher is typically used to weigh food. It is necessary to clean the combination weigher for sanitation requirements. For these cases, the above stated conventional chute is configured such that the upper chute section and the lower collecting funnel section are separated from each other. The lower collecting funnel section is divided into the inner funnel 38, the right outer funnel 37R and the left outer funnel 37L. In other words, the inner funnel 38, the right outer funnel 37R and the left outer funnel 37L are removably mounted together. Because of this, the right outer funnel 37R is provided with a joint surface Rw joined to an outer surface of the inner funnel 38, while the left outer funnel 37L is provided with a joint surface Lw joined to the outer surface of the inner funnel 38.

However, in a state in which the inner funnel 38, the right outer funnel 37R and the left outer funnel 37R are mounted together, there exist gaps (clearances) of about 2 to several mm between the outer surface of the inner funnel 38 and the joint surface Rw of the outer funnel 37R, and between the outer surface of the inner funnel 38 and the joint surface Lw of the outer funnel 37L, and the objects get stuck in the gaps. If the objects remain stuck in the gaps in this way, bacteria and germs are generated, which is not preferable from a sanitary standpoint. In addition, because of a situation in which the objects remain stuck in the gaps, the objects discharged from the combination weigher become deficient.

The present invention has been directed to solving the above described problem, and an object of the present invention is to provide a collecting chute of a combination weigher which has three discharge paths and is able to discharge objects such that the objects do not get stuck in the middle of the discharge path.

Solution to Problem

To achieve the above objective, according to the present invention, there is provided a collecting chute in a combination weigher comprising: a funnel-shaped inner funnel for collecting objects discharged from a plurality of hoppers in an inward direction in a circular shape in which the plurality of hoppers are arranged, and discharges the objects through a first discharge outlet provided at a lower end of the inner funnel, the plurality of hoppers being configured to selectively discharge the objects in the inward direction or in an outward direction in the circular shape; a first outer funnel which is disposed at one side of the inner funnel such that the first outer funnel extends along the inner funnel, collects the objects discharged in the outward direction from the hoppers belonging to a first group, and discharges the objects through a second discharge outlet provided at a lower end thereof, the hoppers being divided into the first group and a second group; and a second outer funnel which is disposed at the other side of the inner funnel such that the second outer funnel extends along the inner funnel, collects the objects discharged in the outward direction from the hoppers belonging to the second group, and discharges the objects through a third discharge outlet provided at a lower end thereof; wherein the inner funnel is divided into a first inner funnel section and a second inner funnel section by a vertical plane, a first chute member has a configuration in which an edge of the first outer funnel is firmly coupled to an outer surface of the first inner funnel section, a second chute member has a configuration in which an edge of the second outer funnel is firmly coupled to an outer surface of the second inner funnel section, and the first chute member and the second chute member are removably mounted to a chute support member.

In accordance with this configuration, by mounting the first chute member and the second chute member to the chute support member, the inner funnel, the first outer funnel and the second outer funnel, are formed, which become three discharge paths of the combination weigher. Since the edge of the first outer funnel is firmly coupled to the outer surface of the first inner funnel section in the first chute member, there exist no gap in which the objects passing through the first outer funnel get stuck. Therefore, the objects do not get stuck in the middle of the first outer funnel and are discharged through the second discharge outlet at the lower end. Likewise, since the edge of the second outer funnel is firmly coupled to the outer surface of the second inner funnel section in the second chute member, there exist no gap in which the objects passing through the second outer funnel get stuck. Therefore, the objects do not get stuck in the middle of the second outer funnel and are discharged through the third discharge outlet at the lower end. Since the inner funnel includes the first inner funnel section and the second inner funnel section into which the inner funnel is divided by the vertical plane, the first chute member and the second chute member can be attached together without a gap (clearance) between the first inner funnel section and the second inner funnel section, and the objects do not get stuck in the middle of the inner funnel and are discharged through the discharge outlet at the lower end. Thus, the objects can be discharged such that the objects passing through each of the three discharge paths do not get stuck in the middle of the discharge path.

The first outer funnel may include a chute section which is disposed outside of the first inner funnel section such that there is a gap between the chute section and the first inner funnel section to cause the objects to pass through the gap and has a second discharge outlet formed by an opening at a lower end of the chute section; and a coupling section extending from an edge of the chute section and firmly coupled to an outer surface of the first inner funnel section; and wherein the second outer funnel includes: a chute section which is disposed outside of the second inner funnel section such that there is a gap between the chute section and the second inner funnel section to cause the objects to pass through the gap and has the third discharge outlet formed by an opening at a lower end of the chute section; and a coupling section extending from an edge of the chute section and firmly coupled to an outer surface of the second inner funnel section.

The collecting chute may further comprise a tubular lower chute which is removably mounted to a lower end of the first inner funnel section and a lower end of the second inner funnel section, and causes the objects discharged through the first discharge outlet of the inner funnel to pass through the lower chute.

In accordance with this configuration, the lower portion of the first inner funnel section and the lower portion of the second inner funnel section can be fastened to each other by the lower chute. The lower chute has a tubular shape, and may have, for example, a funnel shape or a cylindrical shape. That is, the funnel-shaped lower chute is one example of the tubular lower chute.

The collecting chute may further comprise a plurality of upper chutes each of which includes an inner chute section for guiding the objects discharged in the inward direction from n (n: plural) adjacent hoppers to the inner funnel, and an outer chute section for guiding the objects discharged in the outward direction from n adjacent hoppers to the first outer funnel or to the second outer funnel, the inner chute section and the outer chute section being coupled together in a tubular shape.

In accordance with this configuration, since the first chute member and the second chute member are disposed below the plurality of upper chutes, a size of the first chute member and a size of the second chute member can be reduced, and a work for attaching and detaching the chute members can be easily carried out.

Advantageous Effects of the Invention

The present invention has the above described configuration, and has advantages that it is possible to provide a collecting chute of a combination weigher which has three discharge paths and is able to discharge objects such that the objects do not get stuck in the middle of the discharge path.

The above and further objects, features and advantages of the present invention will more fully be apparent from the following detailed description of preferred embodiments with accompanying drawings.

DESCRIPTION OF THE EMBODIMENTS

Hereinafter, preferred embodiment of the present invention will be described with reference to the drawings. Hereinafter, throughout the drawings, the same or corresponding components are identified by the same reference symbols, and will not be described in repetition. The present invention is not limited to the embodiment described below.

(Embodiment 1)

Figure 1A:
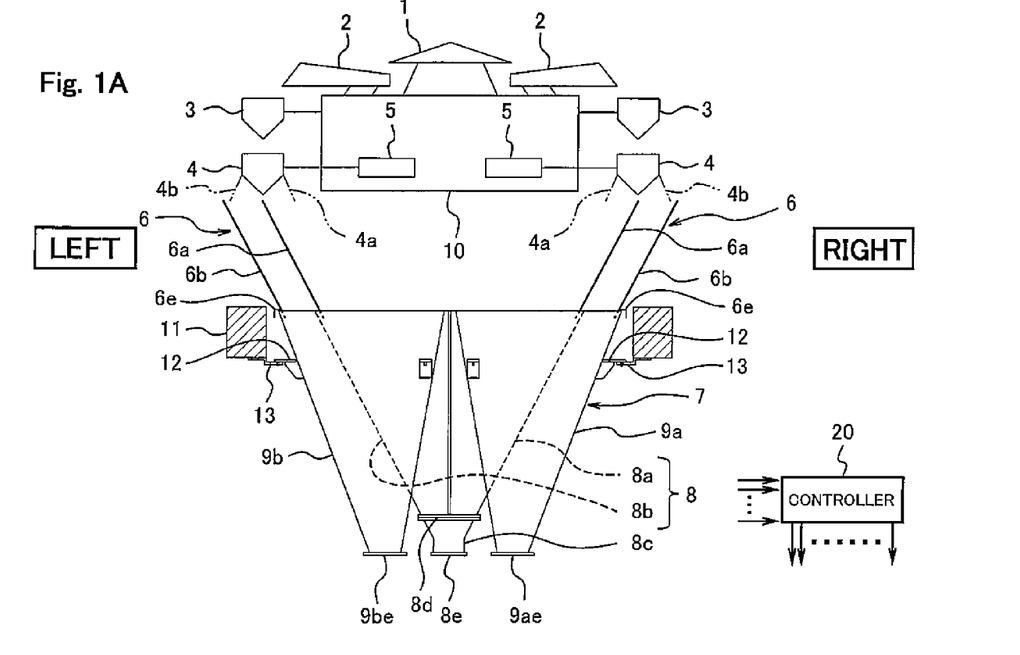
FIG. 1A is a schematic view of a combination weigher using a collecting chute according to an embodiment of the present invention, a part of which is illustrated in cross-section, when viewed from laterally.
Figure 1B:
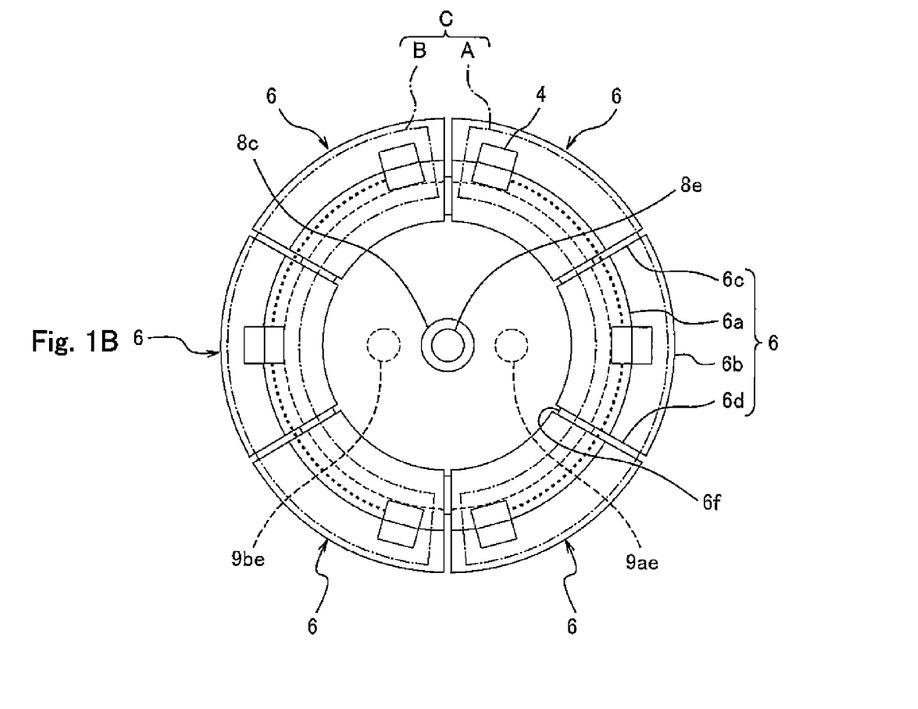
FIG. 1B is a schematic view of a collecting chute and weighing hoppers of the combination weigher when viewed from above.

FIG. 1A is a schematic view of a combination weigher using a collecting chute according to an embodiment of the present invention, a part of which is illustrated in cross-section, when viewed from laterally, and FIG. 1B is a schematic view of a collecting chute and weighing hoppers of the combination weigher when viewed from above. Hereinafter, right and left of the combination weigher are defined as illustrated in FIG. 1A for the sake of convenience. That is, it is supposed that in the combination weigher, one side is a right side and the other side (opposite side of one side) is a left side.

As shown in FIG. 1A, this combination weigher is constructed in such a manner that a center base body (body) 10 is supported by a plurality of legs (not shown) secured to a mount base 11. The mount base 11 is supported on a floor surface or the like by means of a plurality of support columns (not shown). The combination weigher includes a conical dispersion feeder 1 provided at an upper portion of the center base body 10 to radially disperse objects supplied from an outside supplying device, by vibration. Around the dispersion feeder 1, a plurality of linear feeders 2 are provided to feed the objects sent from the dispersion feeder 1 to feeding hoppers 3, respectively, by vibration. The feeding hoppers 3 are provided below the linear feeders 2, respectively, and weighing hoppers 4 are provided below the feeding hoppers 3, respectively, and fed with the objects from the feeding hoppers 3. The feeding hoppers 3 are arranged around the center base body 10 in a circular shape, while the weighing hoppers 4 are arranged around the center base body 10 in a circular shape. The dispersion feeder 1, the linear feeders 2, the feeding hoppers 3 and the weighing hoppers 4 are mounted to the center base body 10. Inside of the center base body 10, driving units for driving the dispersion feeder 1, the linear feeders 2, the feeding hoppers 3 and the weighing hoppers 4, etc., are accommodated. Each of the weighing hoppers 4 is attached with a weight sensor 5 such as a load cell for measuring a weight of the objects inside the weighing hopper 4. The weight sensor 5 is accommodated inside the center base body 10. Measured values are output from the weight sensors 5 to a controller 20.

The weighing hopper 4 is provided with an inner gate 4a through which the objects are discharged in an inward direction in a circle in which the weighing hoppers 4 are arranged and an outer gate 4b through which the objects are discharged in an outward direction in the circle, and is able to selectively discharge the objects in the inward direction or in the outward direction.

The plurality of upper chutes 6 are arranged in the circular shape below the plurality of weighing hoppers 4 arranged in the circular shape. A collecting funnel 7 is disposed below these upper chutes 6. The plurality of upper chutes 6 and the collecting funnel 7 constitute the collecting chute.

Each of the upper chutes 6 is provided as corresponding to the plurality of predetermined (four) weighing hoppers 4 arranged adjacently to each other. Each of the upper chutes 6 has a tubular shape. As shown in FIG. 1B, each of the upper chutes 6 includes an inner chute section 6a, an outer chute section 6b, and coupling sections 6c and 6d for coupling end portions of the inner chute section 6a and end portions of the outer chute section 6b. The outer chute section 6b is provided with a cover section 6e (FIG. 1A) along a lower portion thereof, to prevent trash and the like from entering to inside of a right outer funnel 9a or a left outer funnel 9b. The coupling section 6d is provided at its lower end with a cover section 6f covering a gap between the coupling section 6d and the upper chute 6 adjacent to the coupling section 6d, to prevent trash and the like from entering from outside into the right outer funnel 9a or into the left outer funnel 9b through the gap between adjacent upper chutes 6. The objects which are discharged by opening the inner gate 4a of the weighing hopper 4 slide down on the inner chute section 6a, while the objects which are discharged by opening the outer gate 4b of the weighing hopper 4 slide down on the outer chute 6b.

The collecting funnel 7 includes an inner funnel 8 and a lower chute 8c constituting a center discharge path, a right outer funnel 9a constituting a right discharge path, and a left outer funnel 9b constituting a left discharge path. The inner funnel 8 includes a right inner funnel section 8a and a left inner funnel section 8b, has a funnel shape having a substantially circular upper opening, and includes a discharge outlet 8d formed by an opening at a lower end thereof. The funnel-shaped lower chute 8c is attached to the discharge outlet 8d of the inner funnel 8. The objects pass through the inner chute section 6a of the upper chute 6, slide on the inner funnel 8 and the lower chute 8c, and are discharged through the discharge port 8e of the lower chute 8c.

The right outer funnel 9a is provided at a right side of the inner funnel 8 such that the right outer funnel 9a extends along the inner funnel 8, and has a discharge outlet 9ae formed by an opening at a lower end thereof. The objects pass through the outer chute section 6b of the upper chute 6 disposed above the right outer funnel 9a, slide down on the right outer funnel 9a and are discharged through the discharge outlet 9ae. The left outer funnel 9b is provided at a left side of the inner funnel 8 such that the left outer funnel 9b extends along the inner funnel 8, and has a discharge outlet 9be formed by an opening at a lower end thereof. The objects pass through the outer chute section 6b of the upper chute 6 disposed above the left outer funnel 9b, slide down on the left outer funnel 9b and are discharged through the discharge outlet 9be.

Below the combination weigher, for example, a packaging machine (not shown) including three feeding ports of the objects is disposed. The objects discharged through the discharge outlets 8e, 9ae and 9be are fed into the feeding ports of the packaging machine, respectively, and are packaged therein.

The controller 20 includes, for example, a microcontroller including a CPU and memories such as ROM and RAM which contain operation programs, operation parameters, etc., of the CPU. The CPU executes the operation programs stored in the ROM, to, for example, control an operation of the overall combination weigher, and perform a combination process. That is, the controller 20 controls a vibration operation of each of the dispersion feeder 1 and the linear feeders 2. In addition, the controller 20 controls opening and closing operations of discharge gates of the feeding hoppers 3 and of the weighing hoppers 4.

In the combination process, from among the weighing hoppers 4 arranged in the circular shape, a combination (hereinafter referred to as "combination a") of weighing hoppers 4 in which a total weight of the objects held therein falls within a predetermined weight range (allowable range with respect to a target weight), is found from a group A of the weighing hoppers 4 corresponding to the right half part, a combination (hereinafter referred to as "combination b") of weighing hoppers 4 in which a total weight of the objects held therein falls within the predetermined weight range, is found from a group B of the weighing hoppers 4 corresponding to the left half part, and a combination (hereinafter referred to as "combination c") of weighing hoppers 4 in which a total weight of the objects held therein falls within the predetermined weight range, is found from a group C of all of the weighing hoppers 4. When the three combinations a, b, and c are found, the same weighing hopper 4 is not included in two or more combinations. In addition, preferably, the number of the weighing hoppers 4 included in the group A is equal to the number of the weighing hoppers 4 included in the group B.

Then, the weighing hoppers 4 selected to make up the combination a, the combination b, and the combination c discharge the objects simultaneously. The weighing hoppers 4 selected to make up the combination a and the combination b are caused to discharge the objects by opening the outer gates 4b. The weighing hoppers 4 selected to make up the combination c are caused to discharge the objects by opening the inner gates 4a. The objects discharged from the weighing hoppers 4 selected to make up the combination a slide down on the outer chute section 6b of the upper chute 6 and the right outer funnel 9a and are discharged through the discharge outlet 9*ae*. The objects discharged from the weighing hoppers 4 selected to make up the combination b slide down on the outer chute section 6*b* of the upper chute 6 and the left outer funnel 9*b* and are discharged through the discharge outlet 9*be*. The objects discharged from the weighing hoppers 4 selected to make up the combination c slide down on the inner chute section 6*a* of the upper chute 6, the inner funnel 8 and the lower chute 8*c*, and are discharged through the discharge outlet 8*e*.

The timings when the combination process is performed and the timings when the weighing hoppers 4 selected to make up the combination a, the combination b and the combination c are caused to discharge the objects are merely exemplary, and are not limited to the above examples. For example, the combination a, the combination b and the combination c may be found at different timings, and according to these timings, the timings when the weighing hoppers 4 selected to make up the combination a, the combination b and the combination c are caused to discharge the objects, may be made different from each other.

Alternatively, the controller 20 need not be constituted by a single controller but a plurality of controllers may be dispersed and may cooperate with each other to control an operation of the combination weigher.

Figure 2A:
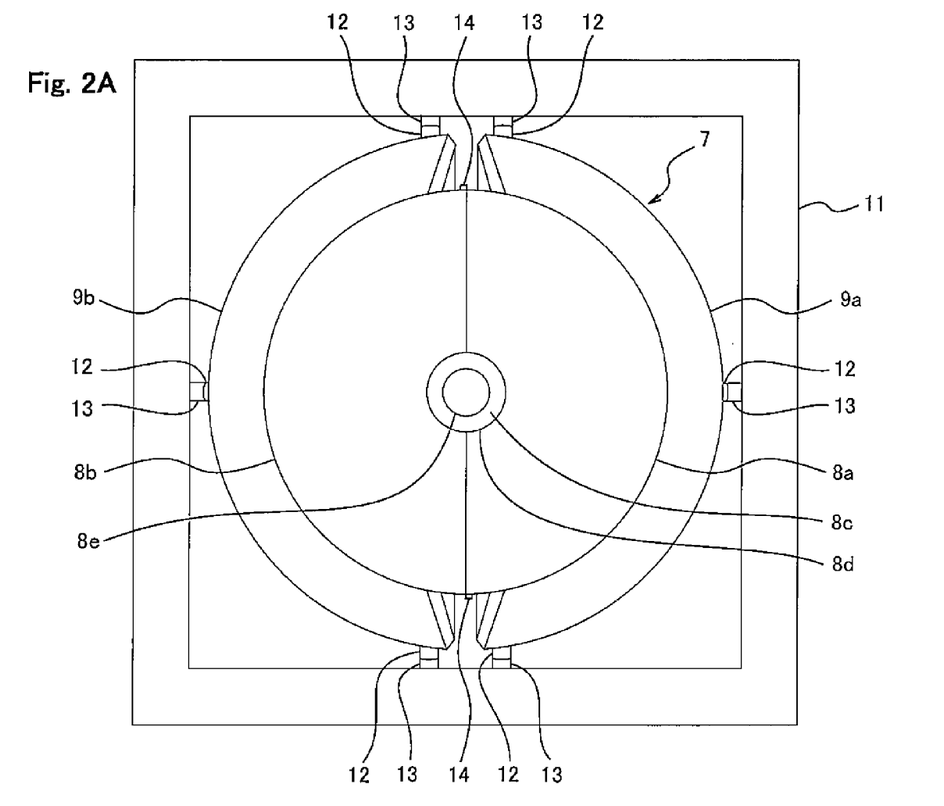
FIG. 2A is a plan view of a collecting funnel in the combination weigher according to the embodiment of the present invention.
Figure 2B:
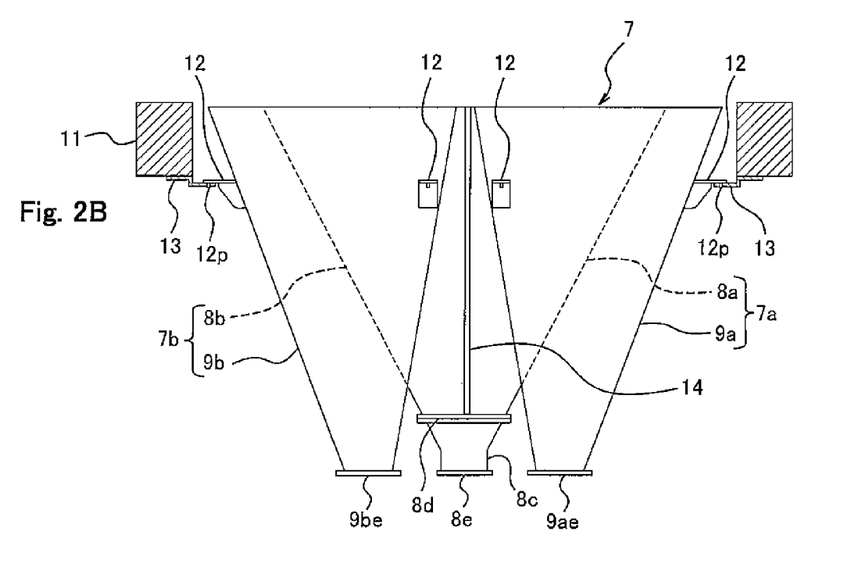
FIG. 2B is a side view of the collecting funnel.
Figure 3:
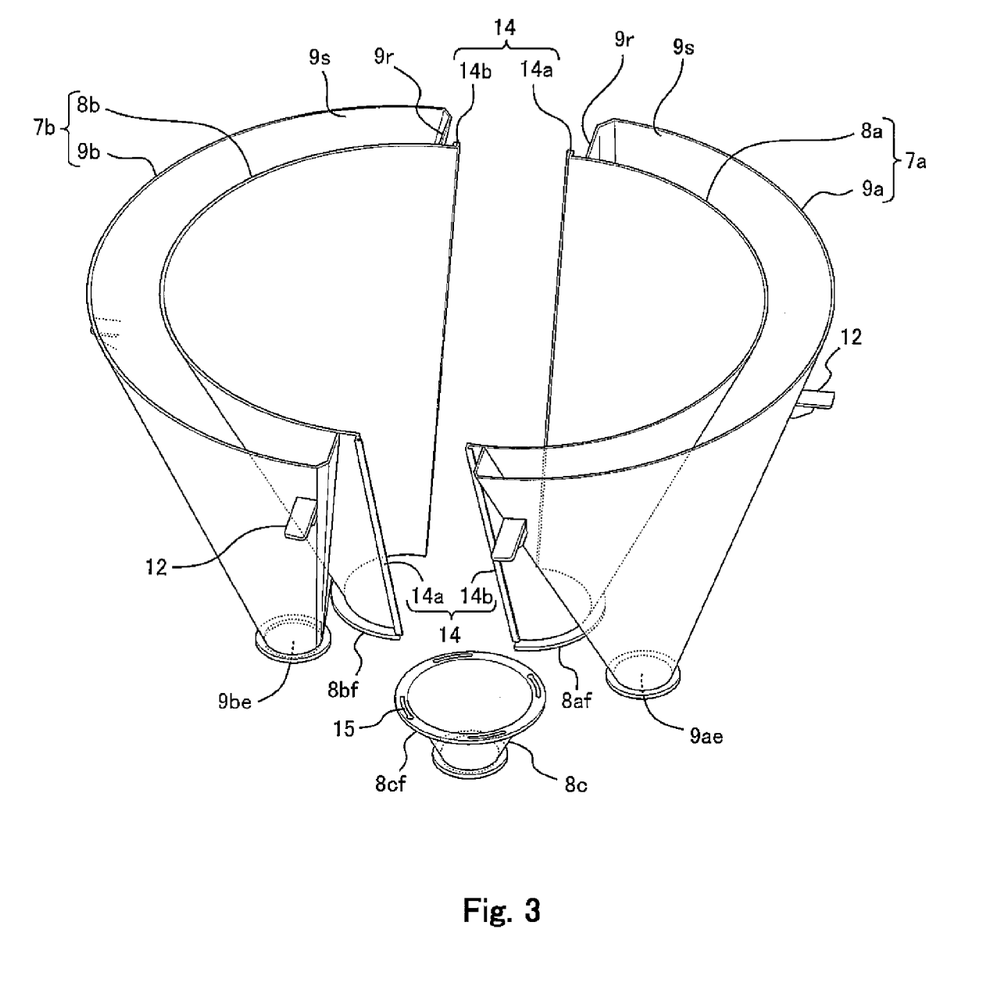
FIG. 3 is a perspective view of the collecting funnel detached from the combination weigher according to the embodiment of the present invention.

FIG. 2A is a plan view of the collecting funnel 7 when viewed from above, and FIG. 2B is a side view of the collecting funnel 7. FIG. 3 is a perspective view of the collecting funnel 7 detached from the combination weigher.

As shown in FIG. 3, the collecting funnel 7 of the present embodiment includes three components which are a right chute member 7*a*, a left chute member 7*b*, and a lower chute 8*c*.

The right chute member 7*a* includes a right inner funnel section 8*a* and a right outer funnel 9*a* which are joined together. The right outer funnel 9*a* includes a chute section 9*s* provided with a discharge outlet 9*ae* at a lower end thereof, and disposed at right side of the inner funnel 8 such that the chute section 9*s* extends along the inner funnel 8, and a coupling section 9*r* for coupling an edge of the chute section 9*s* and an outer surface of the right inner funnel section 8*a*. The chute section 9*s* of the right outer funnel 9*a* is provided to be spaced apart from an outer surface of the right inner funnel section 8*a*. The objects discharged in the outward direction from the weighing hoppers 4 are caused to pass through a space between the chute section 9*s* of the right outer funnel 9*a* and the outer surface of the right inner funnel section 8*a*. The coupling section 9*r* of the right outer funnel 9*a* extends from the edge of the chute section 9*s* and is joined (firmly coupled) to the outer surface of the right inner funnel section 8*a*.

Likewise, the left chute member 7*b* includes a left inner funnel section 8*b* and a left outer funnel 9*b* which are joined together. The left outer funnel 9*b* includes a chute section 9*s* provided with a discharge outlet 9*be* at a lower end thereof, and disposed at left side of the inner funnel 8 such that the chute section 9*s* extends along the inner funnel 8, and a coupling section 9*r* for coupling an edge of the chute section 9*s* and an outer surface of the left inner funnel section 8*b*. The chute section 9*s* of the left outer funnel 9*b* is provided to be spaced apart from an outer surface of the left inner funnel section 8*b*. The objects discharged in the outward direction from the weighing hoppers 4 are caused to pass through a space between the chute section 9*s* of the left outer funnel 9*b* and the outer surface of the left inner funnel section 8*b*. The coupling section 9*r* of the left outer funnel 9*b* extends from the edge of the chute section 9*s* and is joined (firmly coupled) to the outer surface of the left inner funnel section 8*b*.

The right inner funnel section 8*a* and the left inner funnel section 8*b* are right and left parts into which the inner funnel 8 is divided in two evenly in a vertical direction.

Figure 4A:
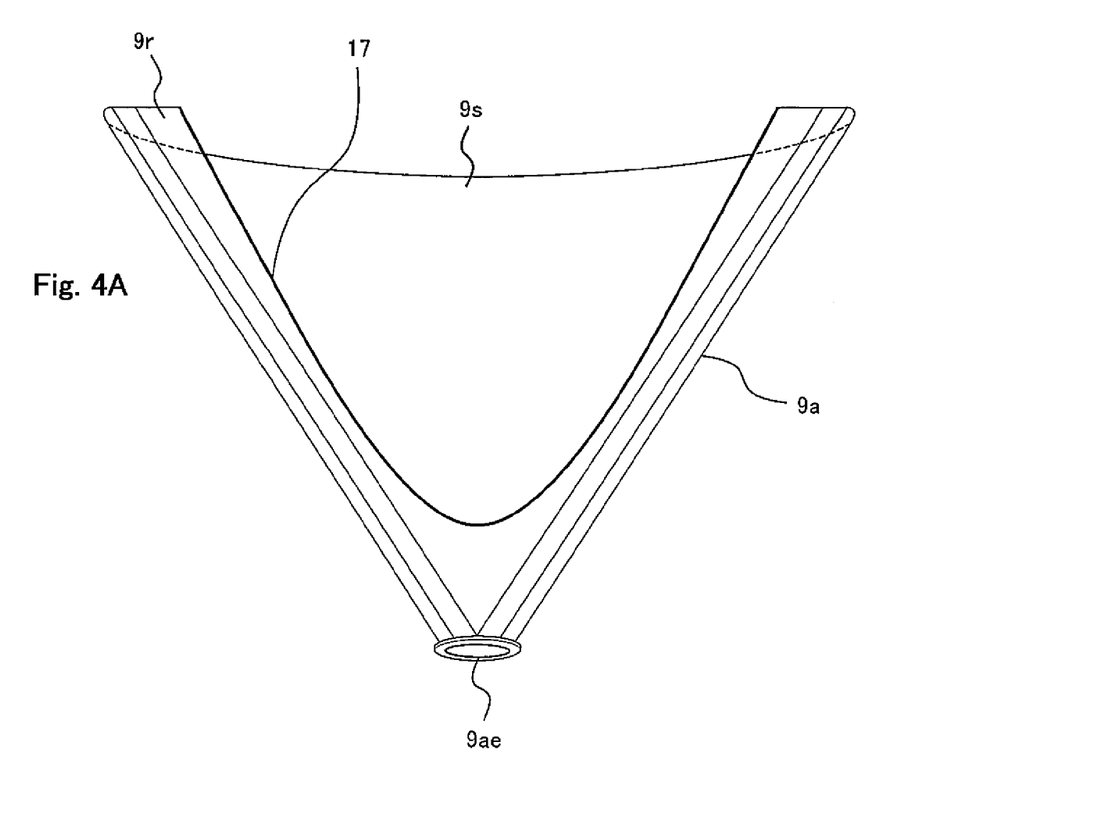
FIG. 4A is a perspective view of a right outer funnel of a collecting funnel according to the embodiment of the present invention, when viewed from obliquely below.
Figure 4B:
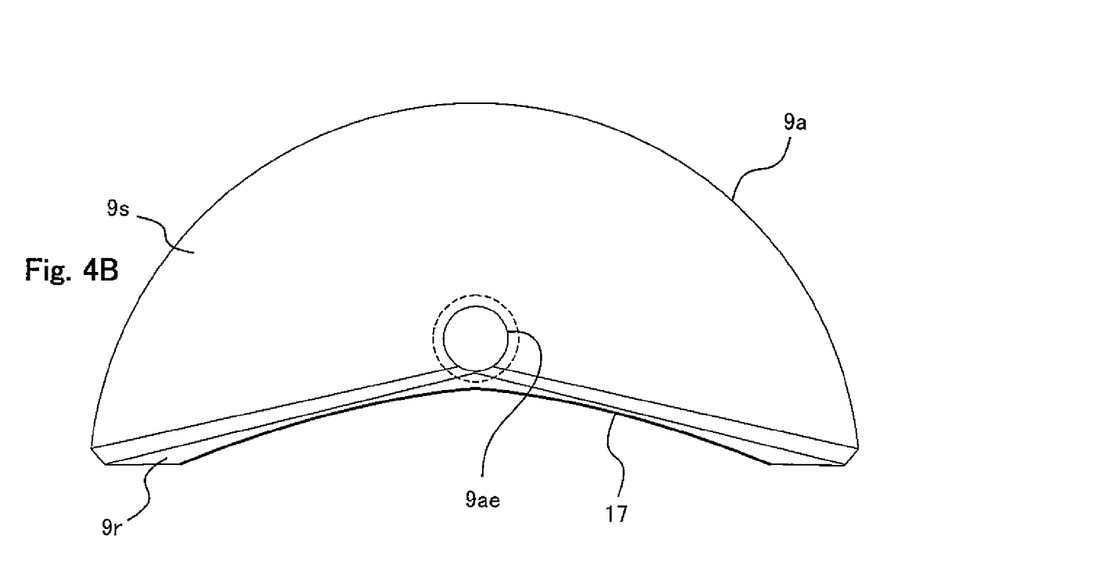
FIG. 4B is a plan view of the right outer funnel.

FIG. 4A is a perspective view of the right outer funnel 9*a* from obliquely below, and FIG. 4B is a plan view of the right outer funnel 9*a*.

An edge 17 indicated by a bold line of the coupling section 9*r* of the right outer funnel 9*a* conforms in shape to the outer surface of the right inner funnel section 8*a*. The edge 17 and the outer surface of the right inner funnel section 8*a* are joined together, by, for example, welding. Thus, the edge of the right outer funnel 9*a* is firmly coupled to the outer surface of the right inner funnel section 8*a*, thereby forming the right chute member 7*a*. The left chute member 7*b* is configured like the right chute member 7*a*. The edge of the coupling section 9*r* of the left outer funnel 9*b* and the outer surface of the left inner funnel section 8*b* are joined together, by, for example, welding. Thus, the edge of the left outer funnel 9*b* is firmly coupled to the outer surface of the left inner funnel section 8*b*, thereby forming the left chute member 7*b*.

As shown in FIG. 3, the right inner funnel section 8*a* is provided with joint surfaces 14*a* and 14*b*, and the left inner funnel section 8*b* is provided with joint surfaces 14*a* and 14*b*. Three hook members 12 are attached on the outer surface of the right outer funnel 9*a* of the right chute member 7*a*. Three hook members 12 are attached on the outer surface of the left outer funnel 9*b* of the left chute member 7*b*. Each of the hook members 12 is provided with a pin 12*p* (see FIG. 2B) protruding downward.

As shown in FIG. 2A, the mount base 11 is provided with a plurality of brackets 13 attached with the hook members 12, respectively. The mount base 11 is a chute support member.

The outer surface of the right inner funnel section 8*a* and the outer surface of the left inner funnel section 8*b* are reverse surfaces of the surfaces (inner surfaces) on which the objects discharged in the inward direction from the weighing hoppers 4 slide down.

[Mounting Method of Collecting Chute]

Figure 5A:
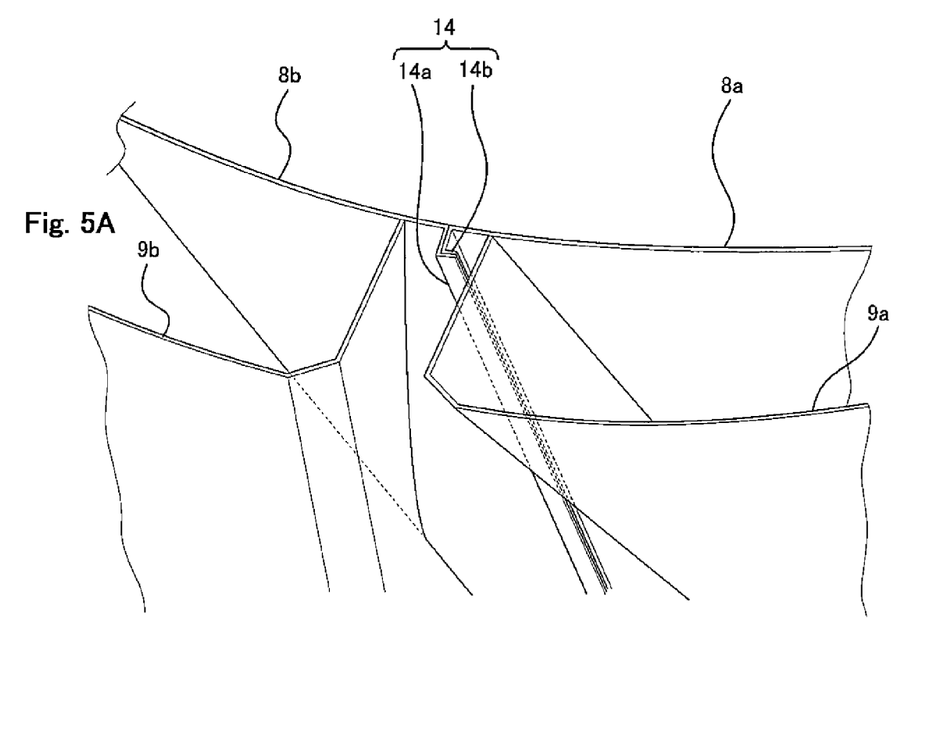
FIG. 5A is a perspective view showing a portion at which a joint surface of a left inner funnel section of the collecting funnel according to the embodiment of the present invention and a joint surface of a right inner funnel section of the collecting funnel, are joined together.

When the collecting funnel 7 is mounted to the combination weigher in a state in which the upper chutes 6 and the collecting funnel 7 have been detached, firstly, the right chute member 7*a* and the left chute member 7*b* are mounted to the combination weigher. The hook members 12 are attached to the brackets 13 fastened to the mount frame 11, respectively. The brackets 13 are provided with holes into which the pins 12*p* of the hook members 12 are inserted, respectively. The pins 12*p* are inserted into the holes, respectively, and the hook members 12 are attached to the brackets 13, respectively. Thereby, in a state in which the inner surface of the right inner funnel section 8*a* and the inner surface of the left inner funnel section 8*b* face each other, the right chute member 7*a* and the left chute member 7*b* are retained on the mount base 11. At this time, the joint surface 14*a* of the right inner funnel section 8*a* and the joint surface 14*b* of the left inner funnel section 8*b* are joined together, and the joint surface 14*a* of the left inner funnel section 8*b* and the joint surface 14*b* of the right inner funnel section 8*a* are joined together. FIG. 5A is a perspective view showing a portion 14 at which the joint surface 14*a* of the left inner funnel section 8*b* and the joint surface 14*b* of the right inner funnel section 8*a* are joined together. The hook members 12 are not shown in FIG. 5A. Although in FIGS. 1A and 2B, the brackets 13 attached with the hook members 12 located at a left side and at a right side of the combination weigher are illustrated, the brackets 13 attached with the two hook members 12 located at a front side are not illustrated.

Figure 5B:
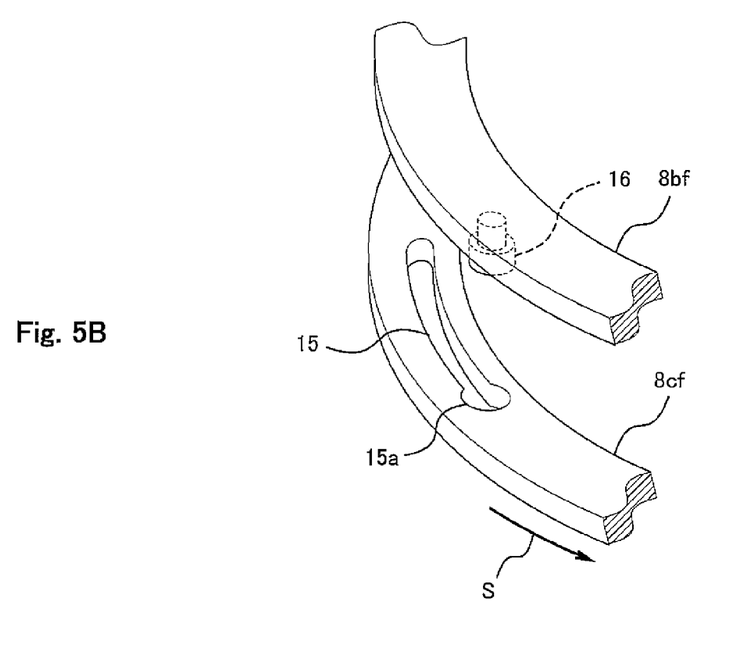
FIG. 5B is a mounting method of the lower funnel of the collecting funnel.

Then, the lower chute 8*c* is mounted. As shown in FIG. 3, the lower chute 8*c* is provided with an upper flange 8*cf*. The upper flange 8cf has four elongated holes 15. As shown in FIG. 5B, the elongated holes 15 have insertion sections 15a each having a greater diameter at one end thereof. The left inner funnel section 8b is provided with a lower flange 8bf at a lower end thereof. As shown in FIG. 5B, a pin 16 inserted into the insertion section 15a is fastened to a lower surface of the lower flange 8bf. Two pins 16 are provided as corresponding to the insertion sections 15a of the two elongated holes 15, respectively. As in the left inner funnel section 8b, the right inner funnel section 8a is provided on a lower surface of a lower flange 8af with two pins 16 (see FIG. 5B) as corresponding to the insertion sections 15a of the two elongated holes 15, respectively. When the lower chute 8c is mounted to the right inner funnel section 8a and the left inner funnel section 8b, the four pins 16 of the right inner funnel section 8a and of the left inner funnel section 8b are inserted into the insertion sections 15a of the four elongated holes 15, and the upper flange 8cf of the lower chute 8c is caused to contact the lower flange 8af of the right inner funnel section 8a and the lower flange 8bf of the left inner funnel section 8b. In this state, the lower chute 8c is rotated in a direction of an arrow S of FIG. 5B, and thus, the lower chute 8c is mounted to the lower end of the right inner funnel section 8a and the lower end of the left inner funnel section 8b.

After the collecting funnel 7 is mounted to the lower chute 8c, the upper chutes 6 are placed on the collecting funnel 7, and fastened to the collecting funnel 7 by means of support members (not shown). In this way, the upper chutes 6 are supported on the collecting funnel 7.

The upper chutes 6 and the collecting funnel 7 are detached by a procedure which is a reverse of the above described procedure.

In the present embodiment, the right chute member 7a and the left chute member 7b are removably mounted to the mount base 11, and the lower chute 8c is removably mounted to the lower end of the right inner funnel section 8a and the lower end of the right inner funnel section 8a. By mounting the right chute member 7a and the left chute member 7b to the lower chute 8c as described above, the above described three discharge paths are formed. Since the edge (edge 17) of the right outer funnel 9a of the right chute member 7a is firmly coupled to the outer surface of the right inner funnel section 8a, the gap (clearance) existing between the outer surface of the inner funnel 38 and the joint surface Rw of the right outer funnel 37R, is not generated unlike the conventional example of FIG. 6. That is, because of the absence of the gap (clearance), the objects do not get stuck in the middle of the right outer funnel 9a and passes therethrough. Then, the objects are discharged through the discharge outlet 9ae at the lower end thereof. Likewise, since the edge of the left outer funnel 9b of the left chute member 7b is firmly coupled to the outer surface of the left inner funnel section 8b, the gap (clearance) existing between the outer surface of the inner funnel 38 and the joint surface Lw of the left outer funnel 37L is not generated unlike the conventional example of FIG. 6. That is, because of the absence of the gap (clearance), the objects do not get stuck in the middle of the left outer funnel 9b and passes therethrough. And, the objects are discharged through the discharge outlet 9be at the lower end thereof. Since the inner funnel 8 includes the right inner funnel section 8a and the left inner funnel section 8b into which the inner funnel 8 is divided in two evenly in a vertical direction, the right chute member 7a and the left chute member 7b are attached together with no gap (clearance) between the right inner funnel section 8a and the left inner funnel section 8b. Therefore, the objects do not get stuck in the middle of the inner funnel 8 and are discharged.

As described above, when the objects are passing through the three discharge paths, the objects do not get stuck in the middle of the discharge paths. As a result, it is possible to realize a combination weigher which can meet sanitary requirements and avoid a situation in which the amount of the objects discharged is deficient.

Although in the present embodiment, the funnel-shaped lower chute 8c is provided at the discharge outlet 8d at the lower end of the inner funnel 8, a cylindrical lower chute removably mounted to the lower end of the right inner funnel section 8a and the lower end of the left inner funnel section 8b, may replace the funnel-shaped lower chute 8c. Or, the lower chute 8c may be omitted. In this case, the lower end of the right inner funnel section 8a and the lower end of the left inner funnel section 8b may be extended downward such that their discharge outlets are set substantially as high as the discharge outlet 9ae of the right outer funnel 9a and the discharge outlet 9be of the left outer funnel 9b. That is, for example, the right inner funnel section 8a and the left inner funnel section 8b may be right and left parts into which the inner funnel 8 of FIG. 6 is divided in two evenly by a vertical plane. In this case, it is desirable to provide a member for securing the lower portion of the right inner funnel section 8a and the lower portion of the left inner funnel section 8b to each other so that they are not separated from each other, and for separating them from each other. In this case, preferably, an operator can easily secure and separate the lower portion of the right inner funnel section 8a and the lower portion of the left inner funnel section 8b by the operator's hands without using a tool.

In the case of a combination weigher of a small size, the upper chute 6 may be omitted, and the collecting chute may consist of only the collecting funnel 7. In this case, the combination weigher may be configured such that the upper end of the inner funnel 8 is immediately below the weighing hoppers 4. In this configuration, the objects discharged in the inward direction from the weighing hoppers 4 directly fall onto the inner funnel 8, and the objects discharged in the outward direction from the weighing hoppers 4 fall onto the right outer funnel 9a and onto the left outer funnel 9b.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a collecting chute which has three discharge paths and is able to discharge objects such that the objects do not get stuck in the middle of discharge paths, etc.

REFERENCE SIGNS LISTS 4 weighing hopper
4a inner gate
4b outer gate
6 upper chute
6a inner chute section
6b outer chute section
7 collecting funnel
7a right chute member
7b left chute member 8 inner funnel
8a right inner funnel section
8b left inner funnel section
8c lower chute
9a right outer funnel
9b left outer funnel
9s chute section
9r coupling section
10 center base body
11 mount base (chute support member)
12 hook member
13 bracket

The invention claimed is:

1. A collecting chute in a combination weigher comprising:
a funnel-shaped inner funnel for collecting objects discharged from a plurality of hoppers in an inward direction in a circular shape in which the plurality of hoppers are arranged, and discharges the objects through a first discharge outlet provided at a lower end of the inner funnel, the plurality of hoppers being configured to selectively discharge the objects in the inward direction or in an outward direction in the circular shape, the inner funnel being divided by a vertical plane into two parts including a first inner funnel section at a first side and a second inner funnel section at a second side, and the plurality of weighing hoppers being divided into a first group and a second group;
a first outer funnel which is disposed at the first side of the inner funnel such that the first outer funnel extends along the first inner funnel section, collects the objects discharged in the outward direction from the hoppers belonging to the first group, and discharges the objects through a second discharge outlet provided at a lower end thereof; and
a second outer funnel which is disposed at the second side of the inner funnel such that the second outer funnel extends along the second inner funnel section, collects the objects discharged in the outward direction from the hoppers belonging to the second group, and discharges the objects through a third discharge outlet provided at a lower end thereof;
wherein a first chute member has a configuration in which an edge of the first outer funnel is firmly coupled to an outer surface of the first inner funnel section, a second chute member has a configuration in which an edge of the second outer funnel is firmly coupled to an outer surface of the second inner funnel section, and the first chute member and the second chute member are removably mounted to a chute support member.

2. The collecting chute of the combination weigher according to claim 1, wherein the first outer funnel includes:
a chute section which is disposed outside of the first inner funnel section such that there is a gap between the chute section and the first inner funnel section to cause the objects to pass through the gap and has a second discharge outlet formed by an opening at a lower end the chute section;
and a coupling section extending from an edge of the chute section and firmly coupled to an outer surface of the first inner funnel section;
and wherein the second outer funnel includes:
a chute section which is disposed outside of the second inner funnel section such that there is a gap between the chute section and the second inner funnel section to cause the objects to pass through the gap and has the third discharge outlet formed by an opening at a lower end of the chute section;
and a coupling section extending from an edge of the chute section and firmly coupled to an outer surface of the second inner funnel section.

3. The collecting chute of the combination weigher according to claim 1, further comprising:
a tubular lower chute which is removably mounted to a lower end of the first inner funnel section and a lower end of the second inner funnel section, and causes the objects discharged through the first discharge outlet of the inner funnel to pass through the lower chute.

4. The collecting chute according to claim 1, further comprising:
a plurality of upper chutes each of which includes an inner chute section for guiding the objects discharged in the inward direction from n (n: plural) adjacent hoppers to the inner funnel, and an outer chute section for guiding the objects discharged in the outward direction from n adjacent hoppers to the first outer funnel or to the second outer funnel, the inner chute section and the outer chute section being coupled together in a tubular shape.

* * * * *